United States Patent [19]

Morita

[11] Patent Number: 5,293,585
[45] Date of Patent: Mar. 8, 1994

[54] INDUSTRIAL EXPERT SYSTEM
[75] Inventor: Noboru Morita, Yokohama, Japan
[73] Assignee: Kabushiki Kaisha Toshiba, Kawasaki, Japan
[21] Appl. No.: 946,157
[22] Filed: Sep. 17, 1992

Related U.S. Application Data

[63] Continuation of Ser. No. 567,242, Aug. 14, 1990, abandoned.

[30] Foreign Application Priority Data

Aug. 31, 1989 [JP] Japan .................................. 1-225301

[51] Int. Cl.$^5$ ............................................. G06C 15/00
[52] U.S. Cl. ........................................ 395/52; 395/61; 395/62; 395/911
[58] Field of Search .................... 395/52, 61, 911, 919, 395/921, 62

[56] References Cited

U.S. PATENT DOCUMENTS

| | | | |
|---|---|---|---|
| 4,648,044 | 3/1987 | Hardy et al. | 364/513 |
| 4,658,370 | 4/1987 | Erman et al. | 364/513 |
| 4,866,634 | 9/1989 | Reboh et al. | 364/513 |

OTHER PUBLICATIONS

Expert Systems: A Non-programmer's Guide to Development and Applications; Paul Siegal; TAB Profession and Reference Books; 1986; pp. 71-102.
Knowledge-Based Computation of Electromagnetic Device Parameters, C. M. Saldanha et al, IEEE Transactions on Magnetics, vol. 24, No. 1, Jan. 1988. pp. 334-337.
Reasoning with Uncertainty in a Knowledge Based System, Eugent S. Santos et 1987 IEEE, pp. 75-80.
A Model and an Architecture for a Relational Knowledge Base, Haruo Yokota et al, 1986 IEEE, pp. 2-9.
Randall Davis, et al., Morgan Kaufmann Publishers, Inc., "Production Rules as a Representation for a Knowledge-Based Consultation Program", 1985, pp. 372-387.
Patrick Henry Winston, et al., Addison-Wesley Publishing Company, "Expert Problem Solving Using If-Then Rules", 1981, p. 239-250.

*Primary Examiner*—Allen R. MacDonald
*Attorney, Agent, or Firm*—Foley & Lardner

[57] ABSTRACT

An industrial expert system for use in designing a plant system or device thereof and in fault detection, includes a knowledge base having a rules-section for describing deductive inference rules. Also included is an expression-section for describing a calculation formula of equality with either a right side or left side being a simple term having a value and the other side being polynomial including known functions. Also included is an attributes-section for declaring the nature and value of each of the attributes cited in calculation and inference and for declaring parameters for controlling communication between a process of deductive inference and a calculation process according to calculation formulas. A deductive inference engine performs deductive inferencing on the basis of the rules, calculation formulae and the attributes stored in the knowledge base. This system uses a simple construction to efficiently perform detection of fault logic by using specific formula or calculation of parameters representing features of a fault which are to be performed during an inference.

11 Claims, 9 Drawing Sheets

---

| | | |
|---|---|---|
| ( DIFFERENCE - BETWEEN - 2 SF - AND - VIBRATION - FREQUENCY | REAL | CALCULATED ) |
| ( POSSIBILITY - OF - ROTOR - ABNORMAL | PREDICATE | INFERRED ) |
| ( POWER - SUPPLY - FREQ | REAL | USER ) |
| ( POLE - NUMBER | REAL | USER ) |
| ( SYNCHRONOUS - SPEED | REAL | CALCULATED ) |
| ( MEASURED - SPEED | REAL | USER ) |
| ( SLIP | REAL | CALCULATED ) |
| ( 2 SF | REAL | CALCULATED ) |
| ( VIBRATION - FREQ | REAL | USER ) |

11 ATTRIBUTES - SECTION ( RULE (N)
  ( IF DIFFERENCE - BETWEEN - 2 SF - AND - VIBRATION - FREQUENCY IS - LESS - THAN 0.1 )
  ( THEN POSSIBILITY - OF - ROTOR - ABNORMAL IS - TRUE )
)

12 RULES - SECTION ( EXPR - 1 ( 120.0 x POWER - SUPPLY - FREQ / POLE - NUMBER = SYNOHRONOUS - SPEED ) )
( EXPR - 2 ( ( SYNCHRONOUS - SPEED ) - MEASURES - SPEED ) / SYNOHRONOUS - SPEED = SLIP ) )
( EXPR - 3 ( 2.0 x SLIP x POWER - SUPPLY - FREQ = 2 SF ) )
( EXPR - 4 ( ABS ( 2 SF - VIBRATION - FREQ ) / 2 SF
        = DIFFERENCE - BETWEEN - 2 SF - AND - VIBRATION - FREQUENCY )

13 EXPRESSIONS - SECTION

10 KNOWLEDGE BASE

```
( DEFUN EXPR-CAL ( )
 ( SETQ V (TERM))
 ( LOOP
 ( COND
    ((OR (EQUAL CHAR'+)(EQUAL CHAR'-))
      (SETQ V ( LIST CHAR V (TERM))
 )
 (T(RETURN V) ) ) ) )

( DEFUN TERM ( )
 (SETQ V (FACTOR))
 (LOOP
   (COND
      ((OR ( EQUAL CHAR' * )(EQUAL CHAR'/))
        (SETQ V ( LIST CHAR V (FACTOR)))
      )
      (T(RETURN V) ) ) )

( DEFUN FACTOR ()
   ( NEXT )
   ( COND (( SYMBOLP CHAR )
           ( SETQ X CHAR )(NEXT)(RETURN X))
          ( T(PRINC" error----")) ) )

( DEFUN NEXT ()
  (SETQ EXPR (CDR EXPR))
  (SETQ CHAR ( CAR EXPR))
  (RETURN CHAR))
```

220
CONVERSION MECHANISM

FIG. 4

```
( DIFFERENCE - BETWEEN - 2SF - AND - VIBRATION - FREQUENCY    REAL       CALCULATED )
( POSSIBILITY - OF - ROTOR - ABNORMAL                         PREDICATE  INFERRED   )
( POWER - SUPPLY - FREQ                                       REAL       USER       )
( POLE - NUMBER                                               REAL       USER       )
( SYNCHRONOUS - SPEED                                         REAL       CALCULATED )
( MEASURED - SPEED                                            REAL       USER       )
( SLIP                                                        REAL       CALCULATED )
( 2 SF                                                        REAL       CALCULATED )
( VIBRATION - FREQ                                            REAL       USER       )
```
11 ATTRIBUTES - SECTION

```
( RULE (N)
  ( IF DIFFERENCE - BETWEEN - 2SF - AND - VIBRATION - FREQUENCY IS - LESS - THAN  0.1 )
  ( THEN POSSIBILITY - OF - ROTOR - ABNORMAL IS - TRUE )
)
```
12 RULES - SECTION

```
( EXPR - 1   ( 120.0 * POWER - SUPPLY - FREQ / POLE - NUMBER = SYNCHRONOUS - SPEED ) )
( EXPR - 2   ( ( SYNCHRONOUS - SPEED ) - MEASURES - SPEED ) / SYNCHRONOUS - SPEED = SLIP ) )
( EXPR - 3   ( 2.0 * SLIP * POWER - SUPPLY - FREQ = 2 SF ) )
( EXPR - 4   ( ABS ( 2SF - VIBRATION - FREQ ) / 2SF
             = DIFFERENCE - BETWEEN - 2SF - AND - VIBRATION - FREQUENCY )
```
13 EXPRESSIONS - SECTION

10 KNOWLEDGE BASE

FIG. 5

A DESCRIPTION - EXAMPLE OF
ATTRIBUTE - ACCURACY ( INLET - COOLING - AIR - TEMPERATURE REAL USER 0.9 )

A DESCRIPTION - EXAMPLE OF
EXPRESSION - ACCURACY ( EXPR - 1
( RATED - VOLTAGE / ( MOTOR - KW + 1000 ) = INSULATION - RESISTANCE - LIMIT )
0.9
)

FIG. 6

ACTIVATION OF THE FUNCTION ( ESTIMATION-ACCURACY EXPRESSION-NUMBER ATTRIBUTE-LIST )
; EXPRESSION-NUMBER IS LIST, INCLUDING EXPRESSION & ITS ACCURACY

DEFINITION OF THE FUNCTION ( DEFUN ESTIMATION-ACCURACY ( EXPR-NUM ATTR-LIST ) )
    ( SETQ EXPR-ACURA ( CADDR EXPR-NUM) )
    ( SETQ CUR-ATTR ( CAR ATTR-LIST ) )
    ( SETQ MIN-ATTR-ACURA ( CADDDR CUR-ATTR ) )
    ( LOOP
        ( COND ( NULL ( CADR ATTR-LIST ) ( RETURN ACCURACY ) )
            ( T ( SETQ ATTR-LIST ( CDR ATTR-LIST ) )
                ( SETQ CUR-ATTR ( CAR ATTR-LIST ) )
                ( SETQ CUR-ATTR-ACURA ( CADDDR CUR-ATTR ) )
                ( SETQ MIN-ATTR-ACURA ( MIN MIN-ATTR-ACURA CUR-ATTR-ACURA ) )
                ( SETQ ACCURACY ( * EXPR-ACURA MIN-ATTR-ACURA ) )
            )
        )
    )
)

;; In above case, accuracy-estimation is simple such as,
;;     Result-accuracy-expression-accuracy x ( minimum value
;;                                                of attribute-accuracies )

FIG. 7

INDUSTRIAL EXPERT SYSTEM

This application is a continuation of application Ser. No. 07/567,242, filed Aug. 14, 1990, now abandoned.

FIELD OF THE INVENTION

The present invention relates to an industrial expert system for use in design/planning and/or fault detection in plant facilities.

BACKGROUND OF THE INVENTION

Inference engines of conventional expert systems utilize a frame and production rules. The term "frame" as used herein means a mechanism for chaining a kind of data base defining mutual relations between attributes concerning facts or observations, etc., or describing definitions, etc., of values of such attributes; "production rules" means a mechanism for chaining deductive inferences.

Deductive inference is performed by citing a list of knowledge for inference "if A, then B", that is, rules.

Rules can be described as follows:

a) If "hot", then "possibly fever".

b) If "temperature>38° C.", then "possibly fever".

In rule a) the truth or falsehood of a conclusion is decided according to truth or falsehood of establishment of phenomenon in a conditional portion. In rule b) truth or falsehood of a conclusion is decided according to whether a value of phenomenon cited in the conditional portion exceeds a certain fixed threshold value.

Inference is performed by tracing, syllogistically, in other words in a chain, rules in a knowledge base listing rules. In this case, a rule is described SO that a final conclusion of a given problem is obtained at the end of inference chain.

In some cases, such as in design planning or fault detection for a plant, all processes up to a final conclusion may not necessarily be expressed by rules or frames.

Thus, for design and planning, an index is calculated representing an amount of some merit or some risk for a condition which is to be cited in a following inference. This is frequently done by citing some simple evaluation formulae in a chain depending upon the content of the intermediate conclusion.

In fault detection applications in order to check the possibility of a fault postulated as an intermediate supposition obtained from observation or investigation, specific formulae are frequently used in a chain together with data. Such data include observation/investigation data and specification/design data which is used to confirm whether or not a fault satisfies a formula describing it phenomenally, or which is used to calculate parameters representing a feature of the fault.

However, it is difficult for a conventional inference engine to realize a process in which the execution of a deductive inference chain is interrupted and a calculation is performed by citing specific formula in a chain. In order to accommodate this, processing must temporarily exit from an inference engine described by a language such as LISP, etc., and an operation process mechanism described by a language such as FORTRAN, etc., (i.e., a language different from that of the inference language). This leads to an increase in the processing time and a complicated mechanism, resulting in a system whose utility is low.

One feature of an expert system is causing knowledge in a knowledge base which is an object of inference to be realized. Knowledge represented by a calculation formula cannot be actualized like a program of an existing language such as FORTRAN, even by an expert system capable of calculating in some way. This is because a conventional knowledge base calculation formula does not adequately express an engineer's knowledge. Even if a conventional knowledge base actualizes inference knowledge, the fact that the calculation formulas have both actual meanings and also meanings based on technical evaluation, is ignored.

Though calculation formulas include the relevant technical content, there is a limit on the accuracy of mathematical expression of the technical content due to the accuracy of modelling. Accuracy of mathematical expression determines the accuracy of a calculation result according to the formula currently involved as well as the accuracy of the constants and variables used therein.

Though every formula has an accuracy of mathematical expression dependent upon the problem to be handled. Conventional expert systems have no function for describing this accuracy and for evaluating the accuracy of the calculation results using such a description.

Considering the technical meaning of mathematical formula and the description of knowledge expressed by the formula, units of constants and variables used in the formula must be attached as knowledge, since values of constants and variables (attribute values) themselves differ with different units. However, this is not actualized in a conventional systems.

For such constants and variables, an expert in a technical field has "typical values" as his knowledge. This is actualized in the conventional system as default values. Moreover, there is an "existing range" of such constants and variables that is the expert's knowledge in the field. The expert has as his knowledge an "existing range" from which, when a value outside this range is obtained, he can decide the value as being an "erroneous measurement" or "erroneous calculation".

However, the conventional system does not do this. That is, a conventional calculation system including an expert system is not capable of expressing the background technical knowledge of such calculation formula, knowledge of accuracy of mathematical expression in the formula and knowledge such as the "unit" of a constant and a variable and "existing ranges of value" inherent to the formula.

This lead to problems including a lack of capability of knowledge expression in the knowledge base, a lack of ability of the expert system to function with the knowledge base and a limited expansion range of adaptation and actual application.

An object of the present invention is to provide an industrial expert system capable of performing, a calculation of an index according to an evaluation formula during rule-based inferencing of plant design and planning, detection of the existence of a fault according to a specific formula during rule-based inferencing of fault detection and calculation of parameters representing features of a fault.

Other objects of the present invention are to improve the description capability of a knowledge base, to facilitate obtaining knowledge and to improve adaptation, adaptation range and the inferencing capability of the expert system. This is accomplished by making a description form of listed calculation formula the calculation formulas describing portions of a knowledge base, which is calculated by a calculation mechanism according to the present invention. This approach is as close to "storage form of expert" or "description form on technical material expert usually uses" as possible, in the same sense that a rule description is made as close to expert knowledge as possible.

A further object of the present invention is to further improve the description capability of the knowledge base by providing expressions of knowledge of expression accuracy of mathematical formula and knowledge of "unit" of constants and variables and "existing range of values", to further improve the capability of expert system.

According to the present invention, these objects are achieved by an industrial expert system for use in designing a plant and in detecting faults therein. The expert system having a knowledge base including a rules-section describing rules of deductive inference, an expressions-section having values corresponding to calculation results of a simple term corresponding to either a right side or left side of equation and describing the other side as a polynomial including a known function. The system also has an attributes-section declaring various natures and values of attributes used in inferencing and calculations and declaring control parameters passing between a deductive inference process and calculation process according to calculation formulae, and a deductive inference engine for performing deductive inference on the basis of the rules stored in the knowledge base, calculation formula and attributes.

According to the expert system constructed in this manner, deductive inference is performed by the deductive inference engine on the basis of the rules stored in the knowledge base, the calculation formula and the attributes. Therefore, the detection of faulty logic by means of specific formula and the calculation of parameters representing the fault during inferencing, and can be processed.

The expressions-section takes the form of a list of calculation formula with formula numbers. The calculation formulas take the form of equality and either the left side or right side thereof is a result of calculation in the form of a simple term. The other side describes an operation formula for obtaining the result. The operation formula is a general polynomial and may include operational symbols such as addition, subtraction, multiplication, division, exponential, parenthesis and known functions such as sine and cosine, etc. Therefore, the description of an operational formula takes a general form which can be described even by a person who has no knowledge of a computer.

For simplicity of description, the calculation result is placed on the right side of a formula and an operational term is placed on the left side.

BRIEF DESCRIPTION OF THE DRAWINGS

In the accompanying drawings:

FIG. 4 is a diagram showing a conversion engine for converting mathematical formula into mathematical formula described by inference language;

FIG. 5 is a block diagram showing a knowledge base used in a backward calculation mechanism;

FIG. 6 is a diagram showing an example of an attribute and description of accuracy of calculation formula; and FIG. 7 is a diagram showing the definition of evaluation function for evaluating accuracy of the calculation result and concrete examples of an energization of this function.

DETAILED DESCRIPTION OF THE PREFERRED EMBODIMENTS

Figure 1:
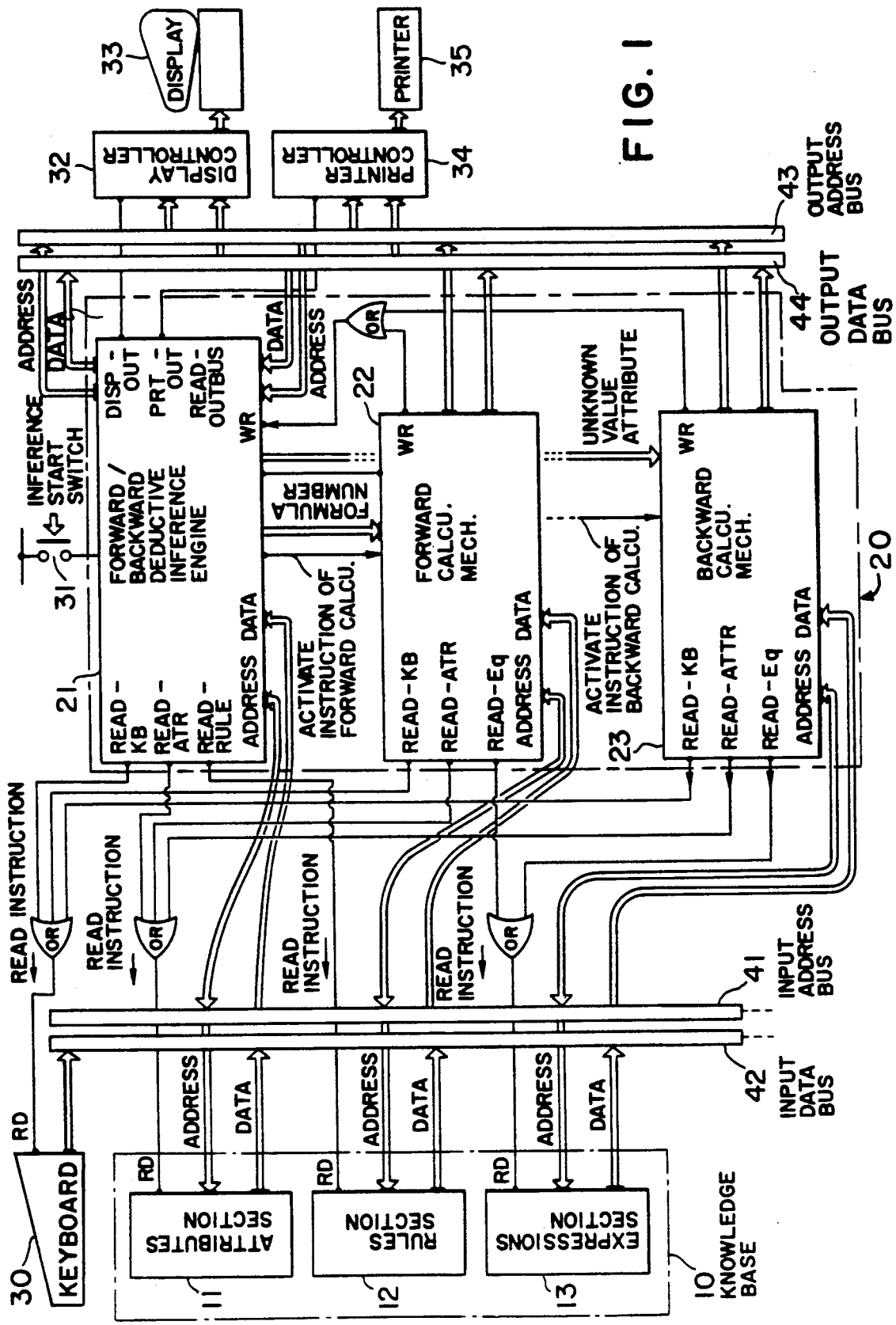
FIG. 1 is a block diagram of an expert system according to the present invention

FIG. 1 shows an embodiment of an expert system according to the present invention. The expert system according to this embodiment comprises a knowledge base 10 including an attributes-section 11, a rules-section 12 and an expressions-section 13, and an inference engine 20 including a forward/backward deductive inference engine 21, a forward calculation mechanism 22 and a backward calculation mechanism 23. The expert system further includes a keyboard 30 for inputting data values, an inference start switch 31, a display controller 32, a display 33, a printer controller 34 and a printer 35. An input address bus 41, and input data bus 42, an output address bus 43 and an output data bus 44 are also provided for the transfer of data between these devices and engines.

The knowledge base 10 comprises a data base composed of memories such as RAMs and/or ROMs, the attributes section 11 stores names and types of attributes. The rules section 12 stores rules of deductive inference and the expression-section 13 stores forward/backward calculation formulae.

Figure 2A:
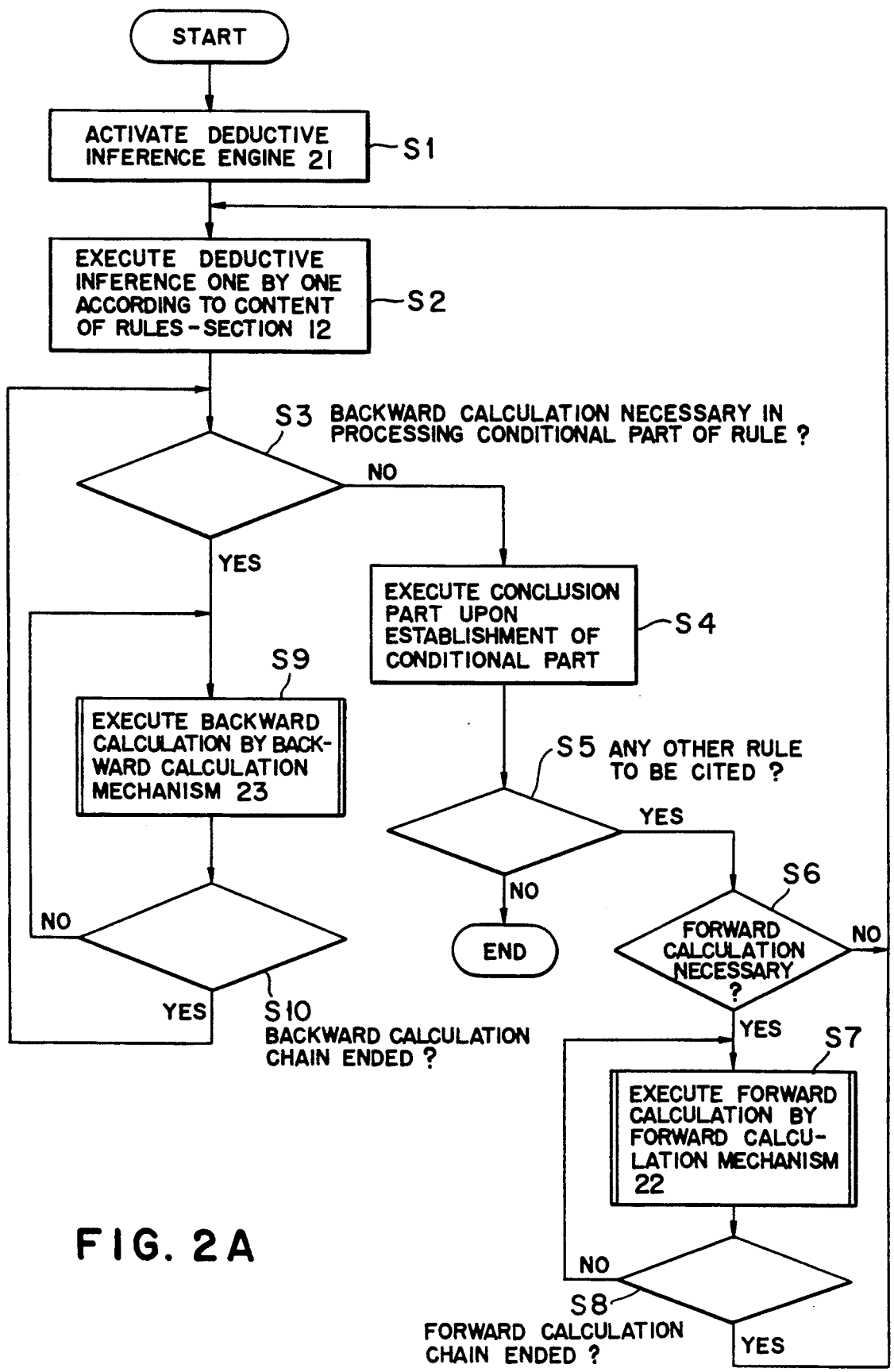
FIGS. 2A, 2B and 2C are flow charts explaining operation of the system shown in FIG. 1.
Figure 2B:
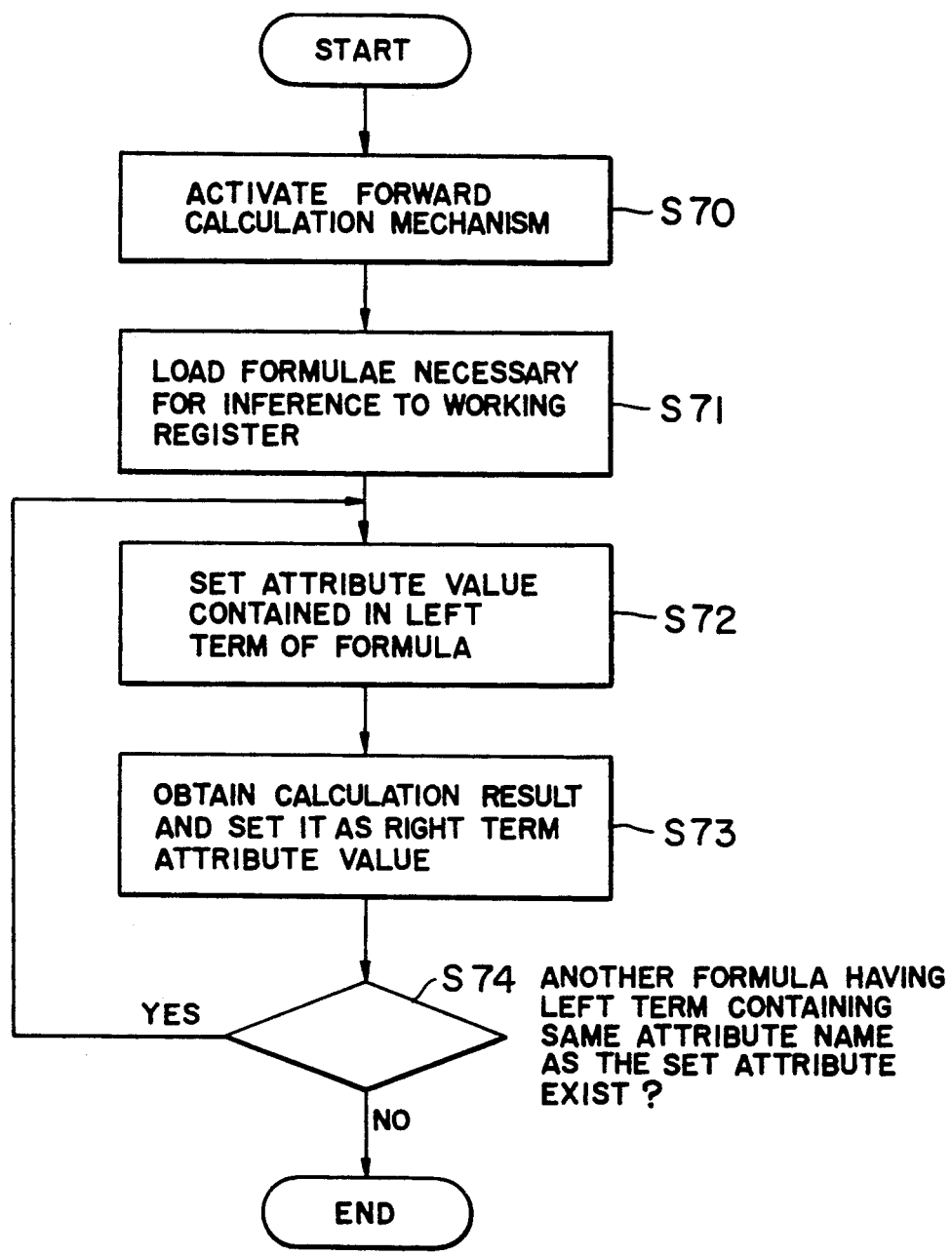
Figure 2C:
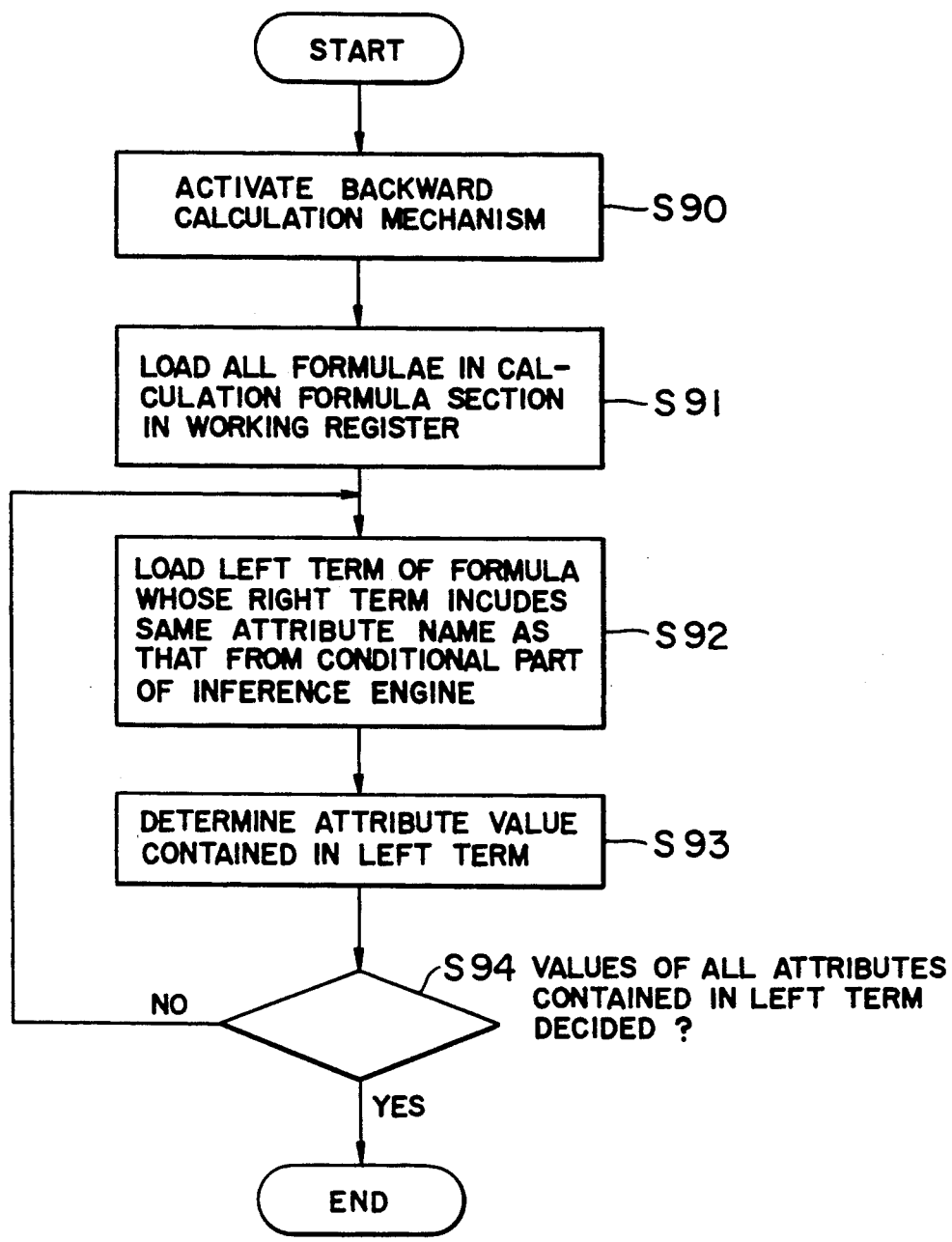

An operation of the system shown in FIG. 1 will be described with reference to flow chart shown in FIG. 2A, 2B and 2C. When an operator depresses the inference switch 31, the deductive inference engine 21 is activated (Step S1). The inference engine 21 accesses, first, the rules-section 12 of the knowledge base 10. The content thereof is transferred through the input address bus 41 and the input data bus 42 to the memory portion of the inference engine 21 and in accordance with the content transferred, a forward/backward inference is executed by the inference engine 21 according to a known algorithm (Step S2). At this time, upon demand, the inference engine 21 accesses the keyboard 30 to take data inputted thereto through the address bus 42 and the data bus 41 into the inference engine 21.

When a forward calculation becomes necessary in the course of the inference process, an instruction flag for forward calculation activation is provided to activate the forward calculation mechanism 22 (Step S3–S7). Upon activation of the forward calculation mechanism 22 (Step S70), the expressions-section 13 of the knowledge base 10 is first accessed. Then, a content (number of formula) of the expressions-section 13 is transferred to the memory portion of the calculation mechanism 22, which may comprise RAMs. Thereafter, the calculation mechanism 22 loads a formula having a formula number corresponding to the formula number transferred from the inference engine 21 to a working register for temporary storage (Step S71). Then, a left side of that formula is loaded to working register for temporarily storing the content of the left side. Thereafter, attributes contained in the left side are picked up one by one and the attributes-section 11 is accessed for each of the attributes to check the values of the register in the memory of the attributes-section 11 showing whether or not a value of each attribute is determined by keyboard input. If the register value is a value indicating input from keyboard 30, then the calculation mechanism 22 accesses the keyboard 30 and sets the value as that of the attribute (Step S72).

When all of the attributes are contained in the left side in this manner, the calculation mechanism 22 drives an operation mechanism to obtain a calculation result and sets this as a value of the right side attribute (Step S73). Thus, the processing of the forward calculation mechanism for one formula is completed.

It is then checked by loading the formula in the temporary formula storage register one by one, whether or not there is any other formula whose right side contains the same attribute name as that whose value is determined for one formula. If there is, the forward calculation is executed for that formula (Step S8 and S7). If not, the forward calculation process is terminated and the forward calculation activation flag is dropped and the operation returns to processing in the deductive inference engine 21 (Step S8 and S2).

Attributes whose values are determined by this chain of forward calculation are cited again in a process for introducing values of attributes in the conditional portion of the rule for which the process is included in a subsequent deductive inference process, in order to decide whether or not the conditional portion of rule is established and whether or not the rule is established. When a backward calculation becomes necessary during the inference process, an instruction flag for activation of backward calculation is provided to activate the backward calculation mechanism 23 (Step S3 and S9).

The necessity of backward calculation occurs for obtaining a value of a calculation formula when the rule conditional portion includes an unknown attribute which is declared according to the definition of the attribute declaration section as that "to be obtained from calculation result".

When the backward calculation is activated (Step S90), all of the formulae in the expressions-section 13 are loaded in the RAM of the calculation mechanism 23 (Step S91). Then, each of the formulas is loaded in the working register for temporary formula storage. When any formula whose right side is the same as the attribute name transferred from the conditional portion of the inference engine is found, a left side of that formula is loaded into the working register for temporary left side storage (Step S92). If there is any attribute in the attributes contained in the left side whose attribute value is unknown, the value is determined by input from the keyboard 30 to (Step S93).

After obtaining values of all attributes contained in the left side, the backward calculation flag is dropped and the operation is returned to the processing of the Step S3.

After the processing in the inference engine 20 is completed a subroutine is selected. The subroutine includes a "displaying on" routine for display 33 and a printer output routine for the printer 35.

The operations of the attributes-section 11, the rules-section 12, the expressions-section 13, the deductive inference engine 21, the forward calculation mechanism 22 and the backward calculation mechanism 23 will be described in more detail with reference to a case where an electric insulation is diagnosed on a basis of the insulation resistance value of an electric machine.

Figure 3:
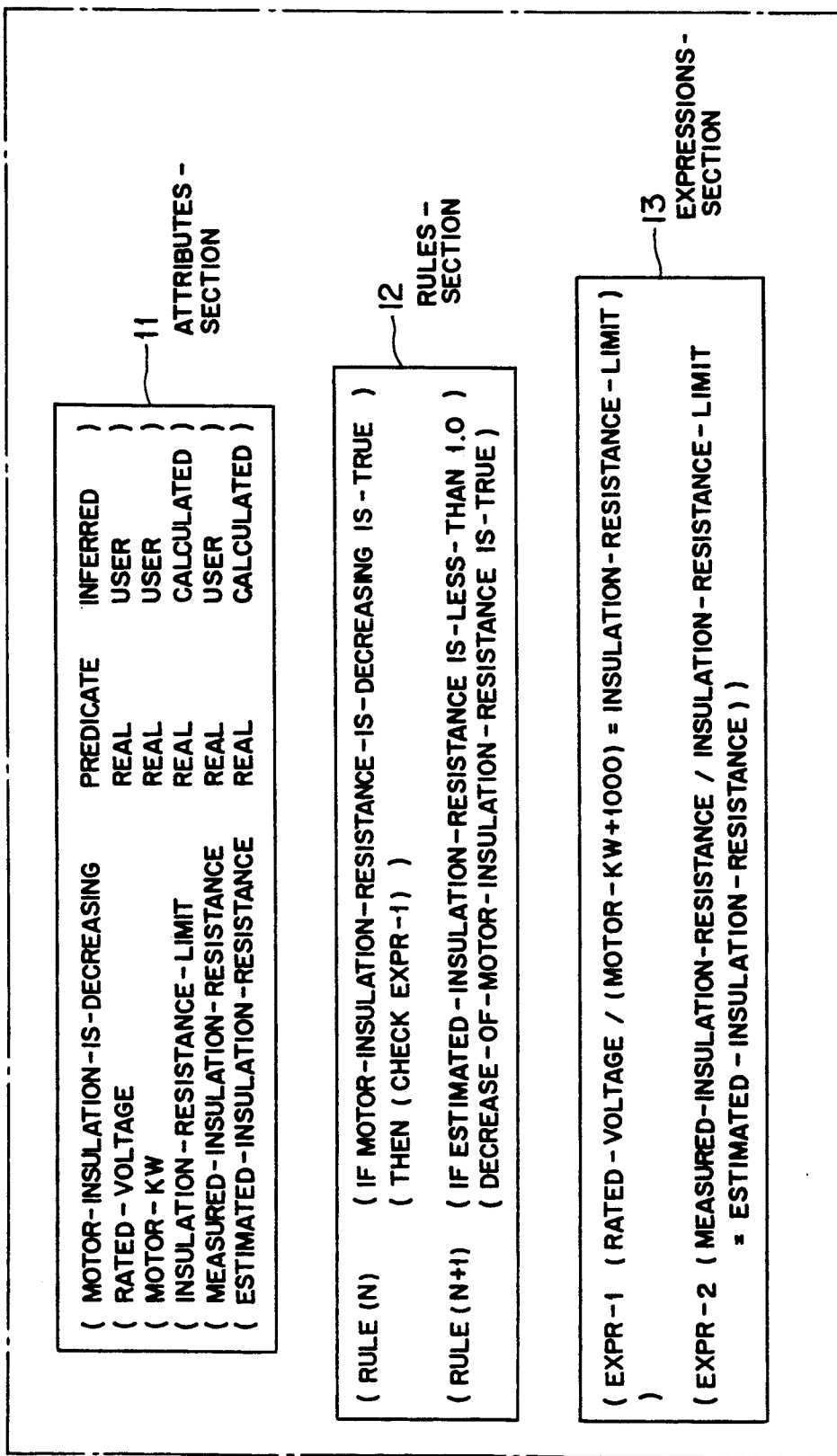
FIG. 3 is a block diagram showing a knowledge base used in a forward calculation mechanism according to the present invention.

FIG. 3 shows an activation of forward calculation, a chain of forward calculations and a citation of calculation result in the rule.

The forward calculation according to calculation formulas will be described with reference to FIG. 3. FIG. 3 shows an example of the knowledge base 10 which includes, in addition to the attributes-section 11 and the rules-section 12, the independent expressions-section 13. With the latter section, it becomes possible to provide in the inference engine 20 a "chained calculation mechanism according to calculation formula" independently from the mechanism for chaining rules. The operation will be described along an inference process performed by the inference engine 20.

It is assumed that, before the operation reaches the shown rule, it is confirmed that the insulation resistance tends to decrease with time.

In the rules-section 12, the conditional portion ("IF" portion) of RULE {N}: MOTOR-INSULATION-RESISTANCE-IS DECREASING becomes "truth" and the conclusion portion ("THEN" portion) or the RULE {N} is activated.

The activation of the conclusion portion in a conventional system is
1) to make the calculation hypothesis described in the conclusion portion "truth",
2) to output m by WRITE and
3) to terminate the inference by STOP, etc. In contrast, the activation in the system of the invention is to enter into a "mechanism for chaining calculations of calculation formula" in the deductive inference engine 21 by describing function activating chaining of calculations according to formula in the expressions-section 13.

In the forward calculation, the number of a formula to be calculated first has to be assigned. Therefore, as an argument of the forward calculation activating function "CHECK", "EXPR-1" (expression-1) is assigned.

When the expression which is first calculated in the forward calculation is assigned, the forward calculation mechanism 22 determines a value attribute contained in the right side of the calculation formula. The determination of the attribute value refers the attributes-section similarly to the conventional inference engine to check whether the type of that attribute, i.e., the attribute value is determined from a user input, or from an inference, or from a calculation result of the calculation formula.

In FIG. 3, the attribute type is described in a third column of the respective attribute list of the attributes section 11 as "INFERRED", "USER" or "CALCULATED".

In the expressions-section 13, the attributes RATED VOLTAGE and MOTOR-KW cited in the left side of the EXPR-1 has the attribute type "USER". Therefore, the value is determined by user input.

With the attribute value of the left side of the EXP-1 determined, the calculation of the left side is started.

The forward calculation mechanism 22 uses a conversion mechanism 220, such as shown in FIG. 4, to convert the expression of the left side into a function (in this example, LISP function) suitable for an inference language.

A result from the conversion mechanism 220 in FIG. 4, for the left side of the EXPR-1, can be expressed by the LISP function as follows:

(/ RATED-VOLTAGE (+MOTOR-KW 1000))

By providing attribute value to this function, the calculation result of the left side of the EXPR-1 is obtained as a value of the function.

With the calculation result, the calculation mechanism 22 sets the result as a value of the attribute of the right side of the expression.

The right side or left side in the calculation mechanism 22 is distinguished according to a list before or after an equality "—" in a list of one calculation expression. For the EXPR-1, (RATED-VOLTAGE/(MOTOR-KW +1000)=INSULATION RESISTANCE-LIMIT), the list before the equality being recognized as left side and the list after the equality being recognized as right side.

When the calculation result of the EXPR-1 is obtained in this manner, the calculation mechanism 22 searches for any expression other than the EXPR-1 which includes in its left side the attribute INSULATION-RESISTANCE-LIMIT of the right side of the EXPR-1.

Since, in this case, the EXPR-2 in FIG. 3 includes in its left side INSULATION-RESISTANCE-LIMIT, the calculation mechanism 22 operates the EXPR-2.

In the EXPR-2, when a value of MEASURED-INSULATION RESISTANCE is input by the user, a calculation result can be obtained through the same process as that for the EXPR-1.

When the calculation result of the EXPR-1 is obtained, the calculation mechanism 22 searches for any other expression which has in its left side the attribute of the calculation result "ESTIMATED-INSULATION-RESISTANCE". If there is no such expression, the calculation mechanism 22 terminates the chain of calculation and is returned to the inference process according to the rules.

In the ruled inference process, the deductive inference engine 21 looks RULE {N+1} in the rules-section 12. Since, although there is "ESTIMATED-INSULATION—RESISTANCE" in the conditional portion of RULE {N+1}, its attribute value has been calculated, a next processing of the conditional portion, that is "threshold value processing" of "IS-LESS-THAN", is performed according to the attribute value.

If this threshold value is satisfied, the hypothesis DECREASE-OF-MOTOR-INSULATION-RESISTANCE (the state where insulating resistance is below a normal limit) of the conclusion portion of RULE {N+1} becomes "truth".

In the above description of the construction and operation of the forward calculation made with reference to FIG. 3, the inference process of the present invention is found typically in the process for obtaining, from the EXPR-1, the parameter INSULATION-RESISTANCE-LIMIT for judging whether or not the insulating resistance is abnormally decreased. That is, this example is to obtain a parameter featuring a fault from the expression.

By changing the content of the expression, it can be easily modified to describe a construction of fault phenomenally.

For example, assuming a fault which makes Kirchhoff's first law unsatisfactory, the calculation mechanism 22 of the present invention can infer an existence of the fault construction in question when an absolute value of δ in a preliminarily prepared expression $$\Sigma V_i = \delta$$

is not less than a certain value.

Although not shown in detail, it is clear that the forward calculation mechanism is effective in calculating indices representing advantage and loss in plan and design problems and in executing a next inference on the basis of the results of calculation.

FIG. 5 Shows an activation of backward calculation, a backward calculation chain and a citation of calculation results in the rules. FIG. 5 exemplifies a knowledge base of a check portion for checking in fault diagnosis whether or not there is an abnormality of a rotor of an induction motor.

When there is an abnormality in a rotor of an induction motor, a vibration occurs whose frequency (2SF) is twice the product of a source frequency F and a "slip" S, which is a difference between a rotation speed of the rotor when synchronized with the source frequency and an actual rotation speed.

The knowledge base 10 in FIG. 5 checks whether a measured vibration frequency is coincident with 2SF. A construction and operation of the backward calculation mechanism 23 will be described with reference to the knowledge base 10 shown in FIG. 5.

It is assumed that the inference engine has been executed according to rules and the operation reaches RULE {N} in the rules-section 12 during a search of a source of fault.

There is an attribute DIFFERENCE-BETWEEN-2SF AND VIBRATION-FREQUENCY in a conditional portion of RULE {N}. In order to determine an attribute value of this attribute, the deductive inference engine 21 first refers to the attributes-section 11 to check the type of attribute. Since, in this case, the attribute type is CALCULATED as shown, the backward calculation mechanism 23 is activated to determine the attribute value. The backward calculation mechanism 23 searches among expressions in the expressions-section 13 for one having right side DIFFERENCE-BETWEEN 2SF-AND VIBRATION FREQUENCY. As a result, the fourth expression EXPR-4 is found.

Then, in order to obtain a result of the fourth expression, the left side is calculated. In order to calculate the left side, an attribute value thereof is necessary. Therefore, the attributes section 11 is referred to determine the attribute value. As a result, the value of attribute "VIBRATION-FREQ" is determined by means of a user input, since the attribute type thereof is "USER". On the other hand, since the attribute type of the attribute 2SF is "CALCULATED", the backward calculation mechanism 23 is activated again to search for any other expression whose right side has the attribute 2SF. As a result, the third expression EXPR-3 is found in the expressions-section 13.

The left side of the third expression includes one ("SLIP") having an attribute type CALCULATED and a further backward calculation is performed.

By repeating a similar backward calculation chain until the first expression EXPR-1, all attribute values in the backward calculation chain from the fourth expression to the first expression are determined, so there is no further backward calculation.

The backward calculation mechanism 23 calculates the left side of the expressions from the first expression in sequence by means of the conversion mechanism 220 shown in FIG. 4 and repeats the process of setting them in values of the right side, resulting in the attribute value of the attribute described in the right side of the fourth expression.

Since the attribute value on which the backward calculation mechanism 23 is activated, the backward calculation by the backward calculation mechanism 23 is terminated and returned to the RULE {N} by which the backward calculation mechanism 23 is activated.

In RULE {N}, since the attribute value of the conditional portion is given, "threshold value" processing of "IS-LESS-THAN" shown in the conditional portion is performed.

If the result of the backward calculation satisfies this threshold value, the conclusion portion of RULE {N} is activated, so that POSSIBILITY-OF-ROTOR-ABNORMAL becomes "truth".

In summary, according to the construction and operation of the backward calculation mechanism 23 shown in FIG. 5, when there is an attribute having its type "CALCULATED" in the conditional portion of the rules, the backward calculation is automatically activated and chains the operation until the attribute value thereof is obtained. When the attribute value is obtained, it is returned to the original rule and continues the inference according to the rule.

This example clarifies that the backward calculation mechanism 23 is effective in realizing the process of checking the construction problem by referring expressions describing the fault construction phenomenally and in finally improving the accuracy of inferencing.

It is clear from the description of the example shown in FIG. 5 that the backward calculation mechanism 23 is effective in calculating the parameters representing features of faults in fault diagnosis or in calculating indices, representing advantage and loss in design and planning problems and that it improves the inferencing capability by providing rules for citing these parameters and indices.

FIGS. 6 and 7 show an example of a calculation mechanism for the accuracy of calculation results and which is necessary for reflecting the accuracy of calculation results to the inference, according to the rule in citing expressions by the forward and backward calculations.

Determination of calculation accuracy is performed by a method (see FIG. 7) in which a function for introducing the accuracy of a calculation depends upon the definition (in the attributes-section) of the attribute accuracy cited in expressions and the definition of accuracy of the expressions (see FIG. 6).

The accuracy definition of an attribute cited in the expressions may be performed by a user when the type of the attribute is user input, provided that the technical level of the user is sufficiently high.

Although in FIG. 6, the function for introducing the accuracy of calculation results is a product of "INSULATION RESISTANCE-LIMIT" and "accuracy of expression" (=0.9) for simplicity of explanation, it is possible to use a function whose accuracy is higher.

When the calculation accuracy is obtained by this mechanism, the accuracy of calculation according to the expression can be reflected to a calculation process of reliability of concluded phenomenon calculated conventionally through a chain of inferences. This is done by using this accuracy as a reliability of conditional phenomenon in the inference. Therefore, in an expert system in which the reliability of the conclusion is important, it is possible to obtain a more accurate final conclusion by reflecting the accuracy of the calculation result according to the expressions to the inference process, and thus, the inference function is improved.

The attributes-section 11, the rules-section 12, the expressions-section 13, the deductive inference engine 21, the forward calculation mechanism 22 and the backward calculation mechanism 23 of the expert system according to the present invention are embodied generally as mentioned below.

The determination of value of an attribute (variable) described in the left side of an expression is performed in the same way as the determination of the attribute value of the conditional portion in the rule expression except for the following case:

In the rule expression, although there is a case where the attribute value is determined from a result of inference according to the rule, there is a case where an attribute value is determined from a calculation result of calculation of expressions, corresponding thereto. Although, attributes are declared in the attributes-section by attribute types for determining attribute values thereof, it is made possible in an inference to declare the type in which the attribute value is determined from the calculation results, correspondingly with the declaration of the type in which the attribute value is determined from inference result.

In the example shown in FIG. 3, the third term "calculated" in the list parenthesized in the declaration section 2 is the declaration that it is obtained from a calculation result.

When an attribute value of an attribute put in the left side of an expression is obtained in this manner, it becomes a calculation step for calculating the left side. Usually, as the language describing the deductive inference engine 21, a conversion mechanism for converting a descriptive format is used to describe a mathematical expression in a format for an inference language, such as LISP, since it is impossible to use a mathematical format.

An example of this conversion mechanism is shown in FIG. 4 using LISP.

Although, in this example, only addition, subtraction, multiplication and division are performed for simplicity of explanation, cases are easily constructed in which exponentials, parenthesis and known functions of sin, cos are used.

Next, a mechanism for chaining expressions in such a way that a calculation result is used in a left side of another expression and so on is provided.

The mechanism has a forward and backward calculation mechanism which uses an algorithm corresponding to forward and backward inferences of a production system.

The forward calculation mechanism 22 obtains a value of an attribute of the left side of an expression first, and then performs a calculation, the result of which is used as a value of a right side thereof.

The backward calculation mechanism 23 goes back and performs calculations of expressions according to an algorithm corresponding to the backward inference in a case where specific rule is activated during an execution of rules-section for deductive inference, there is, in attributes referring in the conditional portion of rule, an attribute whose value is obtained from a calculation result in an expressions section, or there is an attribute in attributes placed in the left side of the expression whose value is obtained from a calculation result of a different expression.

The forward calculation mechanism 22 is used for chaining forward calculations and the backward calculation mechanism 23 is used for chaining backward calculations.

The chain of forward calculations is repeated until attributes already calculated cannot be found in other expressions. The backward inference chain is repeated until there is no attribute in the right side which is obtained from a calculation result of another expression.

The descriptions in the inference engines of the forward calculation mechanism 22 and the backward calculation mechanism 23 can be realized for those corresponding to the inference according to rules of the conventional expert for system, except the expression conversion processing portion.

The activation of the forward calculation is performed by a function whose argument is the number of the expression for starting the calculation chain of the conclusion portion of the rule expression as shown by "CHECK EXPR-1" in FIG. 3 (in the shown example, "CHECK").

After the forward calculation chain is terminated, there is an escape from the expressions section 13 to look for the next rule to that by which the forward calculation is activated.

The backward calculation is activated to obtain an attribute value when, during an execution of inference according to rule, there is an attribute being referred by the conditional portion of the rule which has an attribute value to be obtained from a calculation result in the expressions-section 13. That is, when, in the example shown in FIG. 5, there is an attribute being referenced by the conditional portion of the rule which has an attribute type declared as "CALCULATED" in the attributes section 11.

When the chain of backward calculations terminates and the value of an attribute by which the backward calculation is activated obtained, the operation is exits from the expressions-section 13 and is returned to the rule by which the backward calculation is activated.

In an inference process in which reliability of the inference is important, it is necessary, in addition to the processing of reliability in the inference process according to rule, to reflect an evaluation of accuracy of a result obtained in the calculation process in the expressions section 13 to the reliability of a conclusion of inference according to rule.

In such case, in the expression calculation process, it is necessary to define the accuracy of an expression itself together with accuracy of attributes cited for calculation, that is, accuracy of measured data or reliability of search data, etc., as shown in FIG. 6. For the estimated value of characteristics or parameters obtained as a result of a certain phenomenon, an analysis model is assumed and the accuracy of expression is determined by the closeness of the analysis model to a real phenomenon.

The accuracy of an attribute which is obtained by calculation can be derived by the deductive inference engine 21 from the knowledge base 10 by defining it additionally to respective expressions, e.g., in FIG. 6.

By preparing a function, such as shown in FIG. 7, which has as arguments the accuracy of an attribute derived and accuracy of the expression, it is possible to obtain the accuracy of the calculation result. It should be noted that FIG. 7 is described using the inference language LISP.

In a case where an operation is executed by a chain of forward calculations while evaluating the calculation accuracy, every termination of expression is checked for whether or not the calculation accuracy reaches a threshold value. If it does not reach the threshold value, calculation is interrupted and operation is returned to the rules-section 12, so that inference according to rules can be restarted.

In this case, the calculation result which does not reach the predetermined accuracy is made not a value of accuracy but a value "NIL" so that it is clear that the calculation result was not obtained.

Furthermore, by making a result of another expression whose left side uses the attribute whose calculation result was not obtained, also "NIL", it is possible to make the results of forward calculation chain "NIL" successively, with the final calculation result of the chain being "NIL".

Since the conditional portion of the rule which uses the final calculation result is returned to "NIL" by this process, the conditional portion of the rule corresponding to the calculation result becomes unsatisfactory, so that the fact that calculation result was not obtained is reflected to the inference according to the rule.

With such a mechanism, it is possible to realize an inference process which more closely approximates that of an expert and, by eliminating meaningless low accuracy calculations, the efficiency of inference processing can be improved.

In a case where, during the execution of a backward calculation chain, there is an attribute whose attribute accuracy value is low and where the accuracy of the calculation result to be evaluated does not reach a necessary level defined preliminarily in the knowledge base even if an error of another attribute value in a left side of an expression including the attribute is zero, it is possible to make the calculation result NIL and to interrupt the backward calculation.

Furthermore, by making all results of other expressions using the attribute having a NIL calculation result NIL, it is possible to make the conditional portion of the corresponding portion of the rule by which the backward calculation is activated unsatisfactory, so that the fact that the attribute accuracy to be obtained is lowered by the existence of data whose accuracy is low can be reflected in the rule.

With such a mechanism, an inference process which more closely approximates the expert can be obtained and, by eliminating low accuracy and meaningless calculations, the efficiency of inference processing can be improved.

As a modification of description of an expression, the following means is provided:

When an attribute name is determined by taking an actualization of knowledge into consideration, the order of calculation of expression, etc., may become unclear. This is because the number of characters of the attribute name is large.

In order to solve this problem, it may be possible to describe an expression with a temporary attribute name having a small number of characters and provide a portion describing a relation between the temporary attribute name and the original name whose number of characters is large. In such case, the original long attribute name is declared in the attributes section 11. Furthermore, on the side of the deductive inference engine 21, a process is added by which the relation between the temporary name and the original name is referred so that an expression using the original attribute name is produced internally.

The EXPR-1 in FIG. 3 can be rewritten according to the above mentioned scheme as follows:

(EXPR-1
(V/KW + 1000) = Ri − limit))
(WHERE(V: RATED-VOLTAGE)
(KW: MOTOR-KW)
(Ri − limit: INSULATION-RESISTANCE − LIMIT))

Since the left side of above expression is a standardized limit of insulation resistance according to domestic and foreign standards of electric machinery, the temporary name is described using symbols used in these standards.

By describing temporary attribute names used in expressions with known symbols used in standards, handbooks, or known text books, etc., and attaching meanings thereof next, the of expression capability is further improved.

In order to clarify knowledge description of the calculation formula, the following means is provided:

Since the attribute values used in a calculation usually have units when the calculation is for technical calculation or the calculation is evaluation of efficiency and/or loss, etc., the values cannot be determined without their units.

Therefore, the attributes-section 11 is made capable of declaring units for attributes to be used in the calculation.

The unit declaration is possible by adding a unit description to a list of attributes such as follow:

For EXPR-1 in FIG. 3, for example,
(RATED-VOLTAGE REAL USER "VOLT")
(MOTOR-KW REAL "KW")
(INSULATION-RESISTANCE-LIMIT REAL CALCULATED
("MEG-OHM" "MΩ")) The third example above is one in which a plurality of descriptions are recognized by this knowledge for the identical unit.

With such a unit declaration, the meaning of calculation formula as knowledge becomes more clear, and clarifies a difference from calculation procedure program with a conventional language.

For a calculation processing as the deductive inference engine 21, the unit declaration (standard) has the following merits and improves diagnostic capability to a user.

(1) When a user inputs numerical values, a unit confirmation message is automatically output.

(2) Units can be automatically added at an explanation of calculation result as one of the inference explanation mechanism.

(3) By preparing an inference engine such that a user is asked for not only numerical values but also their units, it is possible to more closely approximate "Q AND A" (=QUESTION AND ANSWER) of the inference engine to a real one.

When the user can input units, it is necessary to define a plurality of descriptions for an identical content, such as in the third example above.

In such case, although there is no meaning in clarifying the calculation formula, the conversation ability between the engine and the user is improved with the benefits (1) to (3).

In order to make the meanings of calculation formula as knowledge description more clear, the following means is prepared.

For the technical calculation or evaluation of efficiency and loss, etc., the value of the attribute to be used in calculation is assumed as falling within a certain range. A value outside this range can be interpreted that it has a wrong unit or the meaning of its attribute is erroneously interpreted. Therefore, the "value within a certain range" is considered as a portion of the knowledge of the calculation formula. Thus, in the attribute declaration, a description defining the above range is provided.

This is possible by adding the above range to the attribute list. Such addition may be performed in various ways, for example:

(1) (RATED-VOLTAGE REAL USER "Volt"
("MIN = "220" MAX = "1200"))

(2) (MEASURED-INSULATION-RESISTANCE REAL USER "MEGOHM"
("TYPICAL" 1.0))

(1) is to define the range and (2) is to show a typical value thereof which is added to the attribute list or included in the inference engine to define upper and lower limits by a "ratio" or "difference" therebetween.

The typical value means an average value (expected value) when its attribute has a normal distribution between the upper and the lower limits or a value the possibility of occurrence of which is highest for other distributions.

In the fields of design and planning and problem and fault diagnosis etc., in which the value of the attribute is important, not only the conventionally used "DEFAULT VALUE KNOWLEDGE" but also "RANGE THE ATTRIBUTE VALUE CAN TAKE" are important knowledge in that field.

According to the above mentioned method, "RANGE OF THE ATTRIBUTE VALUE CAN TAKE" is easily described and improves the description ability of knowledge in the special field.

When a value input by the user is out of this range, it is possible to construct the inference engine such that a suitable message is output to recommend the user to input again. With this, the number of rules can be minimized and the certainty of inference can be improved.

Dependent upon the calculation process environment in software and/or hardware, there may be a case where the economic costs of reconstruction of the inference engine for realizing the effect of the present invention become more important than the problems of increased processing time and complicated construction of the inference engine.

In such case, although the problems of processing time and complicated construction are not solved, it is possible to reconstruct the inference engine by merely adding the following construction to the existing inference engine.

Two knowledge bases describing identical contents with different description formats are provided. One of them serves as "External knowledge base" to which a designer and a user of the knowledge bases can make contact directly. This "External knowledge base" uses a description format characterized by having the same "deductive inference section", "expressions section" and "attributes-section" as those mentioned previously. The other knowledge base uses the existing description format including, for example, "frame" and "deductive inference engine" as an "internal knowledge base" internally automatically produced for execution of inference processing by the inference engine.

In this case, it is possible to add, to the existing inference engine, a mechanism (a kind of translation mechanism) for automatically converting the description format of an "external knowledge base" into that of an "internal knowledge base".

In such a case, the combination of the automatic format conversion mechanism and the existing inference engine performs the operation of the present invention mentioned previously. For the knowledge base designer or the user who directly contacts only the "external knowledge", the inference engine construction seems to exist. Thus, this modified construction achieves the object of the present invention without the problems of processing time and complexity of construction.

With the simple and clear construction according to the present invention, only the inference engine is required to perform a calculation process of intermediate indices of efficiency and loss of design and planning which is using several formula in a chain during deductive inference, or to check the process of phenomenal structure in fault detection and to calculate parameters representing the features of fault.

Furthermore, since the expressions-section can describe attributes not by symbols but by clear words or sentences, the knowledge description ability of the calculation formula itself is improved compared with description using a conventional procedure language such as FORTRAN, in the sense that the meaning expressed by calculation formula is clarified.

Since the expressions-section is a kind of collection of formulae whose description format approximates a memory format of an expert or technical materials, a knowledge engineer can easily obtain knowledge and a specialist can easily produce a knowledge base individually, so that the adaptation of the expert system is improved.

Since the attributes-section uses a description format close to technical term definitions used in technical articles including thesis and standard, etc., by those specialists, a knowledge engineer can also easily obtain knowledge and a specialist can easily produce a knowledge base individually. Therefore, the adaptation of an expert system is improved.

With these advantages, it is possible to improve the inference engine of an expert system and to improve knowledge description ability of a knowledge base therefor, resulting in a further improvement of problem solving ability in design, planning problems and diagnosis problems, etc.

What is claimed is:

1. An industrial expert system for use in designing a plant system or constituent devices thereof and in fault detection, said industrial expert system comprising:
   a knowledge base including i) a rules-section for describing rules for deductive inference, ii) an expression-section for describing calculation formulas, each of said formulas having a single variable value to be determined on one side of an equation, the other side being expressed in the form of a polynomial including known functions, and iii) an attributes-section for declaring the nature and value of each attribute cited in a deductive inference and a calculation thereof, and for declaring parameters for controlling communication between a process of carrying out said deductive inference and a process of carrying out said calculation according to a calculation formula; and
   a deductive inference engine for executing a deductive inference, said inference engine including i) chaining means for processing said rules for deductive inference as well as a collection of the calculation formulas related to said rules stored in said knowledge base and for performing forward/backward inference chaining on the calculation formulas, and ii) means for searching said calculation formulas in order to enable use of calculation results in a conditional part of a rule for deductive inference.

2. The system claimed in claim 1, further comprising a forward calculation mechanism for obtaining a calculation result on the basis of values of respective attributes cited in the polynomial of at least one of the calculation formulas, and a backward calculation mechanism for searching back to a calculation formula when a calculation result of said calculation formula becomes necessary during an execution of a deductive inference by said inference engine and for calculating said polynomial to obtain said calculation result.

3. The system claimed in claim 2, wherein a plurality of calculation formulas are described in said expressions-section and, when an attribute obtained as a result of calculation of one of said calculation formulas is included in a said polynomial of another calculation formula in said expressions-section, execution by said inference engine of chaining forward calculations includes obtaining calculations results of all of said calculations formulas having polynomials including said attribute.

4. The system claimed in claim 2, wherein a plurality of calculation formulas are described in said expressions-section and when, during a calculation of a polynomial of one of said calculation formulas, an attribute value to be obtained from a calculation result of said calculation formulas becomes necessary, said attribute value is obtained by,
   a backward calculation performed by said inference engine by calculation of said polynomial of said one of said calculation formulas when at least one attribute in said polynomial is given as a calculation result of a different calculation formula in said expressions-section, and wherein
   execution of a backward calculation chaining is enabled by activating the backward calculations for all attributes obtainable from said different calculation formula.

5. The system claimed in claim 2, wherein said deductive inference engine activates a forward calculation chaining process by describing, in a conclusion portion of a deductive inference rule, a function by which chaining of calculations is started from a calculation formula assigned by an argument corresponding to a corresponding number of said calculation formula and wherein, after said forward calculation chaining is completed said deductive inference engine processes another rule in a sequence of inference rules, said another rule being next in said sequence to said rule by which said forward calculation was activated.

6. The system claimed in claim 2, further comprising a section for declaring an attribute type for each of the attributes cited in a said deductive inference and calculation process as i) having attribute values inputted by a user or ii) obtained from an inference or iii) obtained from a calculation result of said calculation formula, and wherein, in an attribute type check process for obtaining attribute values of said attributes cited in a conditional portion of said deductive inference, backward calculation chaining is activated when the attribute value is defined from a calculation result.

7. The system claimed in claim 2, further comprising a mechanism for determining an accuracy of a said calculation result including, a first section for defining accuracies of values of attributes cited in said calculation formulas in said polynomial, based on the accuracy of measurement or check, by said attributes-section or user input, a second for defining approximations to truth pheonomena or observations as to accuracy of said calculations formula with respect to other calculation formulas and and executing a function having arguments corresponding to an accuracy of said attribute; and wherein, the accuracy of said calculation result is obtained in addition to obtaining the calculation result itself, so that the accuracy of a calculation result is converted to a certainty of conclusion of a rule citing said calculation result.

8. The system claimed in claim 7, further comprising a mechanism for checking, each time a calculation result is obtained for one of said calculation formulas during execution of forward calculation chaining, whether or not said calculation result satisfies a predetermined accuracy necessary for a deductive inference, and for interrupting said calculation chaining and returning said inference engine to deductive inference when said calculation result does not satisfy said predetermined accuracy.

9. The system claimed in claim 8, wherein, when said mechanism for checking determines that said calculation result does not satisfy said predetermined accuracy, during execution of backward calculation chaining, if there is attribute having low accuracy among attributes inputted by the user or cited from internal and external data bases of the knowledge base, the backward calculation chaining is interrupted, even if other attributes cited in said calculation chaining having an ideal accuracy and a return to deductive inference occurs.

10. The system claimed in claim 1, further comprising a means for defining a unit of a value of an attribute cited in said calculation and a range in which said value falls.

11. The system claimed in claim 1, comprising two knowledge based describing identical content with different description formats, one of said knowledge bases serving as an external knowledge base directly accessible to a user and the other serving as an internal knowledge base and further comprising, in said inference engine, a mechanism for automatically converting a description format of said external knowledge base into a description format of said internal knowledge base.

* * * * *